United States Patent
Robert et al.

(10) Patent No.: US 10,964,930 B2
(45) Date of Patent: Mar. 30, 2021

(54) ELECTRICAL INTERCONNECTS FOR BATTERY CELLS

(71) Applicant: FORD GLOBAL TECHNOLOGIES, LLC, Dearborn, MI (US)

(72) Inventors: Brian Joseph Robert, St. Clair Shores, MI (US); Thomas P. Brackett, III, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/425,216

(22) Filed: May 29, 2019

(65) Prior Publication Data

US 2019/0280281 A1    Sep. 12, 2019

Related U.S. Application Data (62) Division of application No. 15/181,824, filed on Jun. 14, 2016, now Pat. No. 10,347,896.

(51) Int. Cl.
| | |
|---|---|
| *H01M 2/26* | (2006.01) |
| *H01M 2/02* | (2006.01) |
| *H01M 2/20* | (2006.01) |
| *H01M 2/30* | (2006.01) |
| *H01M 2/06* | (2006.01) |
| *H01M 2/24* | (2006.01) |
| *H01M 10/0525* | (2010.01) |

(52) U.S. Cl.
CPC ............ *H01M 2/26* (2013.01); *H01M 2/024* (2013.01); *H01M 2/0275* (2013.01); *H01M 2/06* (2013.01); *H01M 2/202* (2013.01); *H01M 2/24* (2013.01); *H01M 2/30* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 4,049,882 A | 9/1977 | Beatty | |
| 7,900,812 B2 | 3/2011 | Teets et al. | |
| 8,023,269 B2 | 9/2011 | Mitchell et al. | |
| 8,414,977 B2 | 4/2013 | Ikejiri | |
| 2003/0215702 A1* | 11/2003 | Tanjou | H01M 2/204 429/127 |

(Continued)

FOREIGN PATENT DOCUMENTS

JP    2014022141 A    2/2014

OTHER PUBLICATIONS

Wu, Xin et al., "Microstructure Welding Mechanism, and Failure of Al/Cu Ultrasonic Welds," Elsevier, Journal of Manufacturing Processes, 2015, vol. XXX, pp. 1-19.

(Continued)

*Primary Examiner* — Carmen V Lyles-Irving
(74) *Attorney, Agent, or Firm* — David Kelley; Brooks Kushman P.C.

(57) ABSTRACT

A battery pack includes a pouch cell having electrode tabs extending therefrom, each of the tabs defining perforations, a bus bar in contact with the tabs, and respective agglomerations of mechanically bound solid metal particles each filling one of the perforations to mechanically bind and electrically connect the tabs to the bus bar.

17 Claims, 4 Drawing Sheets

(56) References Cited

U.S. PATENT DOCUMENTS

| | | | |
|---|---|---|---|
| 2007/0241164 A1* | 10/2007 | Barnes | B23K 20/1275 228/101 |
| 2013/0072075 A1 | 3/2013 | Kayamoto | |
| 2013/0157104 A1 | 6/2013 | Ulicny et al. | |
| 2014/0106191 A1 | 4/2014 | Itaya et al. | |
| 2018/0287316 A1* | 10/2018 | Robert | H01M 2/202 |

OTHER PUBLICATIONS

Marx, S. et al., "Cold Spraying: Innovative Layers for New Applications," Journal of Thermal Spray Technology, vol. 15(2), Jun. 2006; pp. 177-183.

Yang, Jie, "A Silicon Carbide Wireless Temperature Sensing System for High Temperature Applications," Sensors 13.2 (2013): 1884-1901.

* cited by examiner

ELECTRICAL INTERCONNECTS FOR BATTERY CELLS

This application is a division of U.S. application Ser. No. 15/181,824 filed Jun. 14, 2016, now U.S. Pat. No. 10,347,896 issued Jul. 9, 2019, the disclosure of which is hereby incorporated in its entirety by reference herein.

TECHNICAL FIELD

The disclosure relates to ion pouch battery cells and methods of producing the same.

BACKGROUND

Lithium ion pouch cells have been utilized in a variety of industries including automotive applications. The pouch cell designs are attractive due to their reduced weight and cost as well as optimized packaging efficiency at the battery level, higher specific density, and higher voltage output per cell than many other systems. Thus, lithium ion power systems have become the primary choice for many applications. Traditional electrical interconnects of the pouch cells are formed as fastened threaded studs or ultrasonically welded tabs which may experience mechanical inconsistencies, high contact resistance, bond non-uniformities, and other issues. Additionally, either solution is problematic with regard to connecting a bus bar with tabs formed from dissimilar metals.

Alternative methods such as thermal spray deposition have been developed to provide battery interconnects. Yet, these methods such as arc spray or plasma spray subject the pouch cell to temperatures of up to 20,000° C. Additionally, bonds produced by thermal spray deposition may suffer from oxide depositions.

SUMMARY

In at least one embodiment, a battery pack is disclosed. The battery pack includes a pouch cell having electrode tabs extending therefrom, each of the tabs defining perforations. The battery pack further includes a bus bar in contact with the tabs, and respective agglomerations of mechanically bound solid metal particles each filling one of the perforations to mechanically bind and electrically connect the tabs to the bus bar. Each tab may include at least one row of perforations. The perforations may be circular. The perforations within at least one of the tabs may have different dimensions. The perforations may be arranged in a regular pattern. The agglomerations may cover at least a portion of the tabs. The agglomerations may be free of voids, oxide inclusions, or both. Each of the particles may have a discrete crystalline structure.

In another embodiment, a battery pack is disclosed. The battery pack includes a bus bar and a pair of pouch cells. The pouch cells each have a castellated tab extending therefrom, and are arranged adjacent to one another such that the castellated tabs are aligned and interdigitate to contact the bus bar. The battery pack further includes an agglomeration of solid metal particles mechanically bound to each other, the castellated tabs, and the bus bar to electrically connect the castellated tabs to the bus bar. The first castellated tab may include a pair of prongs. The adjacent castellated tabs may include prongs that are in contact with one another. The prongs of a first castellated tab may have different dimensions than the prongs of a second castellated tab. The tabs may include at least one perforation each. The agglomeration may be free of voids, oxide inclusions, or both.

In yet another embodiment, a battery pack is disclosed. The battery pack may include a bus bar and a plurality of pouch cells. The pouch cells may each have a tab extending therefrom to a different height as compared with other of the pouch cells, and be arranged adjacent to one another such that the tabs are aligned and form a terrace with each of the tabs contacting the bus bar. The battery pack may further include respective agglomerations of mechanically bound solid metal particles layered over an end of each of the tabs and a portion of the bus bar to electrically connect the tabs to the bus bar. A height of the first tab may be at least 50% of a height of a second tab. The plurality of pouch cells may include at least three cells. The tabs may have a different chemical composition. At least some of the tabs may have a width smaller than a width of the bus bar. The agglomerations may be free of voids, oxide inclusions, or both.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

With mass-production of batteries, a variety of battery formats have been developed. Example battery formats include cylindrical cells, button cells, prismatic cells, and pouch cells. The pouch cell design represents an efficient use of space and achieves about 90-95% packaging efficiency. Instead of using a metallic cylinder and glass-to-metal electrical feed-through, conductive foil tabs are typically welded to the electrodes and are fully sealed while extending outside of the pouch. By eliminating a metal enclosure, the weight of the pouch cell is reduced.

While a pouch cell is a lightweight solution to the battery design, the pouch format presents a number of considerations such as requirement for support and space to expand. Additional concerns are exposure to humidity and high temperatures which may shorten life of the cell. Swelling represents yet another concern, for example swelling by up to 8-10% over 500 cycles may be typical with some types of pouch cells. Yet, pouch cells have become popular, especially in the same performance criteria as cylindrical cells. Pouch cells have been successfully utilized in consumer, military, as well as automotive applications. Relatively large flat pouch cell packs have been applied in electric powertrains and Energy Storage Systems. Relatively small pouch cells have been used for portable applications with high load current requirements.

Figure 1A:
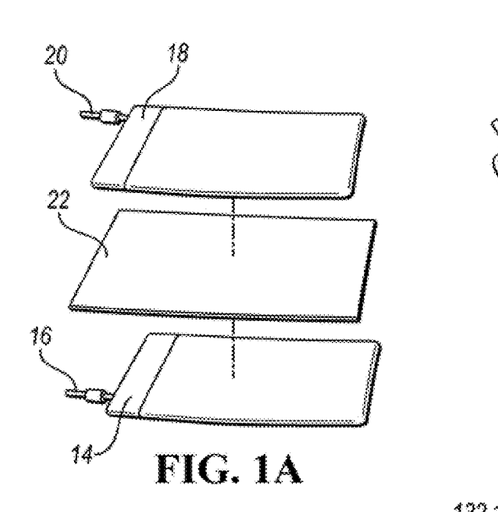
FIG. 1A depicts an exploded view of individual layers within a pouch cell battery depicted in FIG. 1B.
Figure 1B:
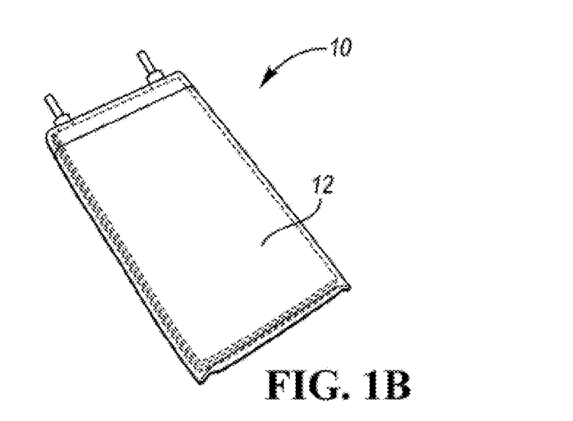
FIG. 1B depicts a perspective view of an example pouch cell battery.

An example lithium-ion pouch cell 10 is depicted in FIGS. 1A and 1B. As can be seen in FIGS. 1A and 1B, a pouch cell 10 has a laminated architecture in a pouch 12. The pouch 12 includes a cathode 14 with a battery tab or terminal 16, an anode 18 with a battery tab or terminal 20, and a separator 22 sandwiched between the cathode 14 and the anode 18. After the laminated layers 14, 18, 22 are assembled together and inserted into the pouch 12, the pouch 12 is filled with electrolyte and subsequently sealed in such as a way that the tabs 16 and 20 are outside of the pouch 12.

The pouch cells 10 are typically lithium-ion batteries with liquid electrolyte. The electrolyte may be gelled via an addition of a polymer additive. The cells 10 are also called LiPo for lithium polymer. Yet, a variety of alternative lithium-ion electrochemistries may be employed. The tabs, or terminals, 16, 20, of the lithium-ion pouch cell 10 usually have different chemistries because they are internally connected to the cathode 14 and anode 18 which are formed from dissimilar metals. The current collectors, the cathode 14 and the anode 18, are typically made from copper, aluminum, or nickel foils. The tabs 16, 20 are usually formed from the same metal as the respective electrode 14, 18 to avoid creation of a galvanic cell between the electrode and the tabs. Yet, the presence of tabs 16, 20 formed from dissimilar metals presents a challenge when the tabs 16, 20 are to be connected to a bus bar due to metal incompatibility which may lead to higher incidence of corrosion, increased resistance, and a lack of joint robustness.

The electrode interconnects between the tabs and the bus bar have traditionally consisted or either fastened threaded studs or ultrasonically welded tabs. The latter exhibits a number of issues such as inconsistent bond uniformity and apparatus (horn and anvil) fatigue issues. Using the fastened threaded studs, on the other hand, may result in mechanical failure and high contact resistance.

To avoid the above-mentioned disadvantages, thermal spray deposition techniques have been utilized to form the interconnects between the bus bar and the electrode terminals. Many of the methods utilize high-temperature thermal spray processes to deposit the solderable material. The thermal spray deposition techniques are generally processes enabling layering of a wide range of feedstock material on a substrate at high deposition rates. Yet, the methods employ relatively high temperatures causing the material to melt. In thermal spray processes, the bonding mechanism is mechanical interlocking, and the bonding may be improved by increasing temperature or particle velocities. But the high processing temperatures generally increase the amount of oxides embedded in the coating, reduce the coating's performance for structural applications, and potentially damage the cell. For example, the cell separator 22 usually has a relatively low temperature tolerance which limits the applicable processes. Example thermal spray techniques and the temperature ranges typically associated with them include a plasma spray process with temperatures between 9,727° C. (10,000 K) and 19,727° C. (20,000 K), wire arc with temperatures of about 14,727° C. (15,000 K), detonation gun deposition utilizing temperatures of about 5,227° C. (5,500 K), or high velocity oxyfuel deposition (HVOF) with temperatures of about 5,227° C. (5,500 K).

Therefore, it would be desirable to provide electrode terminal-bus bar interconnects applied in a way which would eliminate high-wear tooling components such as horn and anvil from the assembly process, alleviate interfacial debonding and through-thickness fractures which are typical for ultrasonic welding, reduce degradation and parasitic inductance by producing dense, layered coatings with low porosity and oxidation, and provide superior corrosion resistance and low electrical resistance while maintaining such process temperatures which would prevent destruction of the cell or creation of oxide inclusions.

Figure 2:
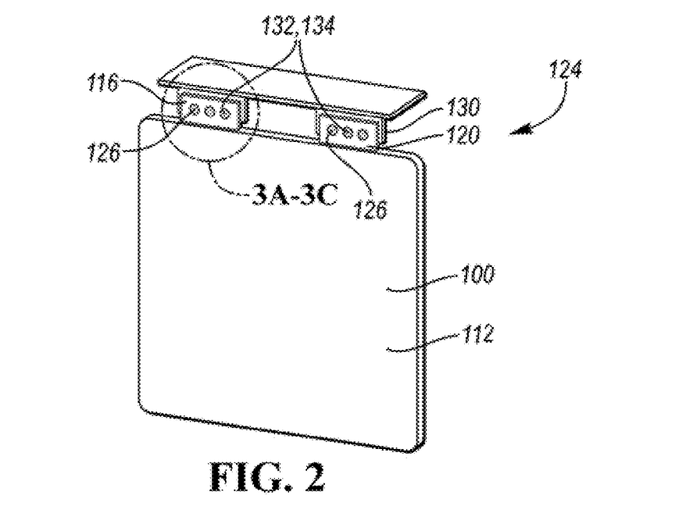
FIG. 2 depicts a perspective view of an example pouch cell connected to an example bus bar according to one or more embodiments.

In one or more embodiments, depicted in FIG. 2, a battery pack 124 is disclosed. The battery pack includes a pouch cell 100 with the cathode tab 116 and an anode tab 120 extending from the pouch 112. The tabs 116, 120 are aligned with a bus bar 130 such that the tabs 116, 120 are in contact with the bus bar 130. The tabs 116, 120 may be made from copper, aluminum, nickel, zinc, lead, the like, or a combination thereof. A protective layer may be formed on the surface of the one or more tabs to promote bonding of the tabs to the busbar. The protective layer may include nickel, titanium, zinc, silver, gold, tin, the like, or a combination thereof. The tab 116 may be made from the same or different material as the tab 120. The surface of either or both of the tabs 116, 120 may be at least partially smooth or textured to increase surface area for the bond between the tabs 116, 120 and the bus bar 130.

The tabs 116, 120 include one or more perforations 126. Each perforation 126 is filled with an agglomeration 132 of mechanically bound solid metal particles which facilitate bonding of the tabs 116, 120 to the bus bar 130. The perforations 126 may be partially filled with the agglomerated material 132 such that at least a portion of a perforation 126 remains free of the agglomerated material 132. Alternatively, the entire surface area of the busbar 130 in contact with and outlined by the perforation 126 may be covered with the agglomerated material 132. The agglomerations 132 may cover at least a portion of the tabs 116, 120. The perforations 126 may be filled with the metal particles forming agglomerations 132 in such a way that respective agglomerations 132 are not in contact with each other. Alternatively still, an agglomeration 126 may fill and/or cover more than one perforation 126. An agglomeration 132 may have a thickness that does not exceed a thickness of the tab 116, 120. Alternatively, the agglomeration 132 may have a greater thickness than the thickness of the tab 116, 120. An agglomeration 132 may have a diameter which does not exceed a diameter of a perforation 126. Alternatively, a diameter of an agglomeration 132 may be greater than a diameter of the perforation 126.

The tabs described herein may include one or more perforations 126. A plurality of perforations 126 may contribute to better heat conductance than presence of just a single perforation 126. Additionally, providing a plurality of perforations 126 increases the number of sites for the deposition of agglomerations 132, which in turn contributes to increased joint robustness and lessens a chance of attachment failure between the tabs and the bus bar.

Figure 3A:
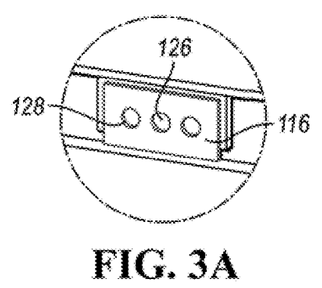
FIGS. 3A-3C depict detailed example perforation patterns on tabs depicted in FIG. 2.
Figure 3B:
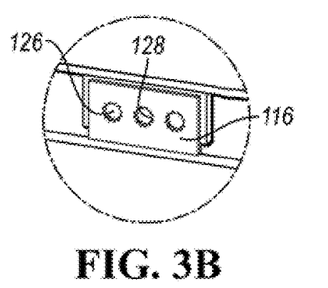
Figure 3C:
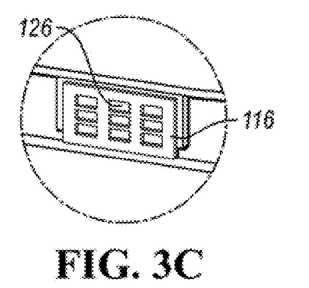

The tabs 116, 120 may include the same or different number of perforations 126 having the same or different shape, cross-section, dimensions, orientation, and other properties. Example perforations 126 are depicted in FIGS. 3A-3C. While FIGS. 3A-3C depict the tab 116 and perforations 126, the tab 116 and perforations 126 are just examples, and the description is applicable to any tab and perforation described herein. As can be seen in FIG. 3A, the tab 116 may include perforations 126 which are regularly spaced apart from each other. The perforations 126 may have a cross section which is a circle, an oval, a square, a rectangle, a pentagon, a heptagon, an octagon, a nonagon, a trapezium, a triangle, a star, a quatrefoil, a kite, a regular shape, an irregular shape, a symmetrical shape, an asymmetrical shape, the like, or a combination thereof. The perforations 126 may have a perimeter 128 which is smooth, rugged, ridged, coarse, jagged, the like, or a combination thereof. In one or more embodiments, some of the perforations 126 may have a perimeter 128 which is not smooth. Alternatively, some perforations 126 may include smooth portions and coarse portions. The coarseness may provide additional surface area for bonding. An example smooth edge 128 may be seen in FIG. 3A, and an example jagged edge 128 can be seen in FIG. 3B. The tab 116 may include one or more rows of perforations 126. Single-row perforation tabs 116 are depicted in FIGS. 3A and 3B while an example of a multi-row perforation tab 116 is depicted in FIG. 3C.

The perforations 126 may constitute about less than 5%, 5%, 10%, 20%, 30%, 40%, 50% or more of the surface area of the tab surface area. The dimensions of a perforation 126 may differ from dimensions of at least one other perforation 126. Alternatively, all perforations 126 may have the same dimensions. All of the tabs 116, 120 may have the same pattern of perforations 126. The pattern may be regular or irregular, symmetrical, or asymmetrical. Alternatively, a tab may include a different pattern of perforations 126 than at least one other tab. Providing the same pattern of perforations 126 for all the tabs may simplify the manufacturing process. Yet, customization is contemplated and varying patterns may be beneficial, for example, if respective tabs vary in thickness and/or composition of material. The perforations 126 in the tabs may be provided by a number of techniques, for example by stamping, punching, blanking, embossing, by another type of pre-handling, or a combination thereof.

Figures 4A, 4B, 4C, 5:
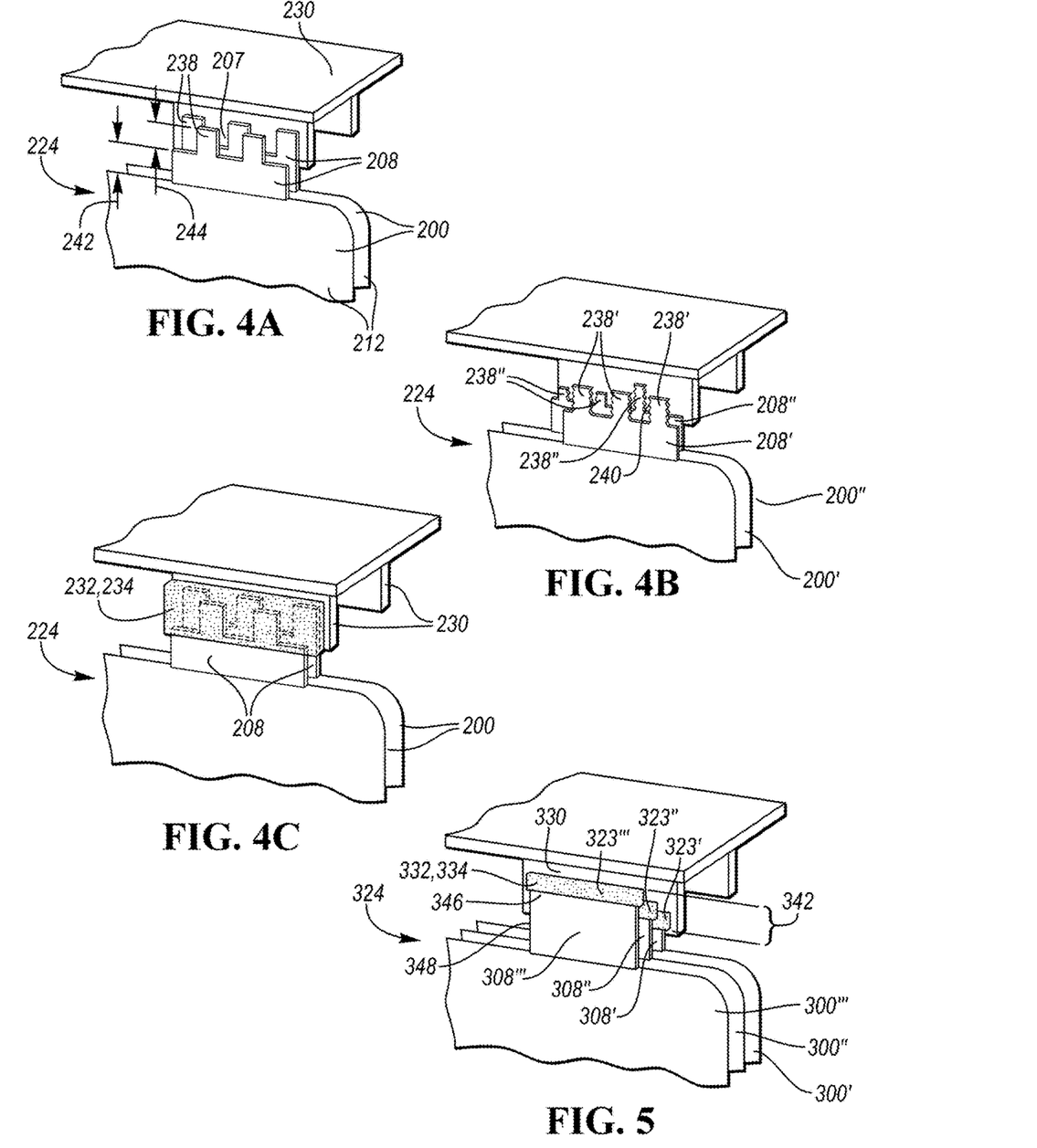
FIG. 4A depicts a perspective view of a portion of an example battery pack having castellated tabs.
FIG. 4B shows an alternative embodiment of the battery pack with castellated tabs depicted in FIG. 4A.
FIG. 4C depicts the battery pack of FIG. 4A or 4B with castellated tabs connected to the bus bar.
FIG. 5 shows a perspective view of a portion of an alternative example battery pack having tabs connected to the bus bar forming a terrace.

In another embodiment, depicted in FIGS. 4A-4C, a battery pack 224 is disclosed. The battery pack 224 includes pouch cells 200. The pouch cells 200 may form a pair. Alternatively, the battery pack 224 may include more than two pouch cells 200. Each pouch cell 200 has a castellated tab 208 extending therefrom. The castellated tab 208 may be a cathode tab 216 or an anode tab 218. Alternatively, just one of the cathode and anode tabs 216, 220 may be a castellated tab 208 while the other tab is free of a castellated design.

The castellated tab 208 has one or more prongs 238 separated from one another with a gap. The overall profile of the castellated tab 208 resembles a castle having battlements. The number, shape, orientation, location, and dimensions, of the prongs 238 and gaps 207 may differ. For example, as can be seen in FIG. 4A, a first castellated tab 208 has two prongs 238 while the second castellated tab 208 has three prongs 238. Any number of prongs 208 is contemplated as long as the prongs of adjacent tabs 208 interdigitate to contact the bus bar 230. The prongs 230 may have the same or different dimensions, shape, or the like. For example, the prongs 238 may have rounded edges. Alternatively, the edges of the prongs 238 may be even, uneven, regular, irregular, jagged, curved, pointed, ridged, serrated, smooth, the like, or a combination thereof. As can be seen in FIG. 4B, each castellated tab may include three respective prongs. The first tab 208' includes three prongs 238' having the same dimensions and shape, each prong 238' having a generally rectangular shape with a flat top and wavy sides having a plurality of crests and troughs. The second tab 208" has three prongs 238", two of which have smaller height than the third prong 238" and the prongs 238' of the first tab 208'. The prongs 238" of the second tab 208" facing the prongs 238' of the first tab 208' have wavy sides with crests corresponding to troughs of the prongs 238' and troughs corresponding to crests of the prongs 238'. The above-named properties of the prongs 238', 238" of both tabs 208', 208" have to be such as to enable the castellated tabs 208 to interdigitate and contact the bus bar 230.

Alternatively, the prongs 238 may have a square or rectangular shape with pointed corners. The height and/or width of multiple prongs 238 may be the same or the height, width, or both of a prong 238 may differ from at least one other prong 238. For example the prongs 238 located in the center of a tab 208 may have greater dimensions than the remaining prongs 238. Any dimensions, shape, orientation, and location of a prong 238 within the tab 208 is contemplated as long as the at least two tabs 208 are castellated and interdigitate.

As is depicted in FIGS. 4A and 4B with respect to two example tabs 208 in contact with each other, the lower portions 242 of the tabs 208 are aligned with each other and layered such that the lower portions 242 of the tabs 208 are in direct contact with each other. On the other hand, the prongs 238, forming the top portions 244 of the tabs 208, are not in contact with each other. Instead, the prongs 238 interdigitate and become intertwined like fingers of folded hands while maintaining a gap 240 between the interdigitated prongs 238 of the two tabs 208 in contact. In one or more embodiments, at least some of the prongs 238 may overlap each other. The tabs 208 may include one or more perforations 126 described above.

The top and/or side edge(s) of at least some of the pouches 212 may, but not have to be flush with each other. For example, as can be seen in FIG. 4A-4C, the first and second pouches' top and side edges are flush with each other.

An agglomeration 232 of solid metal particles is mechanically bound to the castellated tabs 208 and to the bus bar 230. The agglomeration 232 thus forms interconnects 234 which electrically connect the tabs 208 to the bus bar 230. In one or more embodiments, depicted in FIG. 4C, the interconnects 234 are formed from a single elongated stripe of the agglomerated material 232 creating a coating or an overlay 236. The agglomeration 232 may be continuous or discontinuous. Alternatively, the interconnects 234 may include more than one respective agglomeration 232. For example, a set of respective agglomerations 232 may be applied over the layered castellated tabs 208 and the bus bar 230. An example application of the agglomerations 232 may include a set of respective agglomerations forming stripes filling the one or more gaps 240 between the respective interdigitated prongs 238 of at least two tabs 208. Alternatively still, individual agglomerations 238 covering the gaps 240 may be combined with one or more elongated agglomeration 238 overlays.

In yet another embodiment, depicted in FIG. 5, a battery pack 324 is disclosed. The battery pack 324 includes a plurality of pouch cells 300. Each pouch cell 300 has tabs 308 extending therefrom to a different height than other tabs 308 of other pouch cells 300. The pouch cells 300 are arranged adjacent to one another such that the tabs 308 of various heights are aligned and form a terrace 342 with each of the tabs 308 contacting the bus bar 330. The terrace 342 resembles flat areas created on a side of a hill to grow crops such as terraced rice paddies. The individual flat areas are formed from respective agglomerations of mechanically bound solid metal particles which are layered over an end portion 346 of each of the tabs 308 and a portion of the bus bar 330. The end portion 346 may include about less than 5%, 5%, 10%, 20%, 30%, 40%, less than 50% of the surface area of the respective tab 308. The agglomerations 323 form interconnects electrically connecting the tabs 308 to the bus bar 330.

As is further depicted in FIG. 5, the terrace 342 includes a first tab 308' or the first pouch cell 300', the tab 308' being aligned with the bus bar 330 such that the bus bar 330 and the tab 308' lay flat against each other. An agglomeration 323' connects the first tab 308' with the bus bar 330. The second tab 308" has a greater height than the first tab 308' such that the second tab 308" contacts the bus bar 330 while being aligned with the first tab 308'. An agglomeration 323" is deposited over the bus bar 330 and the top portion of the second tab 308". The third agglomeration 323'" is likewise deposited over the bus bar 330 and the third tab 308'", which has a greater height than the second tab 308", such that the third tab 308'" contacts the bus bar 330. The top and/or side edge(s) of at least some of the pouches 312 may, but do not have to be flush with each other. For example, as can be seen in FIG. 5, the first, second, and third pouches' top and side edges are flush with each other.

While the depicted embodiment in FIG. 5 shows three agglomeration layers 323', 323", and 323'", greater or smaller number of agglomeration layers is contemplated and depends on the number of cells 300 to be connected within the battery pack 324. Likewise, dimensions and shape of the tabs 308 and the dimensions, shape, and location or the agglomerations 323 may be the same or differ throughout the battery pack 324 and may be those described above. The differing dimensions may be the height, width, thickness, or a combination thereof. The dimensions of the tabs 308 may differ as long as all the tabs 308 have a direct contact with the bus bar 330. The height, width, and/or thickness of the tabs 308 may be smaller than the height, width, and/or thickness of the bus bar 330. The height, width, and/or thickness difference between the smallest and the greatest tab 308 may be about less than 10%, 10%, 20%, 30%, 40%, 50%, 60% or more. The location of the agglomerations 323 may be at the top portion 346 of the respective tab 308, at one or more side edges 348 of the tab 308, or both. The agglomeration 323 may be continuous or discontinuous.

For example, the height of the tabs 308 may differ, as was described above with respect to FIG. 5. Alternatively, the height of the respective tabs 308 may be the same and the width may differ such that the tab 308' of the pouch cell 300 located closest to the bus bar 330 has the smallest width. An agglomeration 323 is deposited over the side edges 348 and/or the top edge/end portion 346 of the tab 308'. A second tab 308' having a greater width than the first tab 308' is aligned with the first tab 308', and an agglomeration is deposited over the side edge 348, and optionally over the top edge/end portion 346, of the second tab 308". An additional tab 308'" or more tabs 308, each with an increasing width, may be placed on top of the preceding tab and layered over with an agglomeration. A final agglomeration layer may be deposited once all of the tabs 308 have been layered and secured to the bus bar 330 via the agglomerations 323.

The agglomerations 132, 232, 332 form the battery interconnects 134, 234, 334. The interconnects are thus formed as an agglomeration of solid particles mechanically bound to each other and the substrate via plastic deformation. The substrate includes the bus bar 130, 230, 330 and the tabs 116, 216, 316, 120, 220, 320. The agglomeration of particles may be formed using a cold spray deposition method also called gas dynamic cold spray (GDCS). The cold spray deposition is an impact consolidation method. The cold spray deposition differs from hot spray processes mentioned above by using a much lower temperature such as ambient temperature of about 24° C. (297.15 K) to about 80° C. (353.15 K) such that the material which is being deposited onto a substrate remains in a compliant, but solid state. The temperature may be increased beyond the range named above to achieve higher pliability and softness of the particles as long as the elevated temperature is below the melting point of the particles and the substrate. Thus, the cold spray deposition is a process of depositing particles without a phase change. Since there is no phase change, all particles in the agglomeration have the same thermo-mechanical history which leads to uniform properties of the interconnects.

During a cold spray deposition process, powdered metal particles are deposited on a substrate by ballistic impingement at supersonic velocities to form a layered coating or a free-form structure. An example schematic depiction of a cold spray system 50 can be seen in FIG. 6. The system 50 includes a powder feeder 52 for accepting a powder feed 54 having particle size of about 1-100 μm in diameter. The feed 54 may be a powder including metals such as Mg, Al, Si, Sc, Ti, V, Cr, Mn, Fe, Co, Ni, Cu, Zn, Zr, Nb, Mo, Rh, Pd, Ag, In, Sn, Hf, Ta, W, Ir, Pt, Au, Re, polymers, ceramics, composite materials, metal matrix composite materials, nanocrystalline materials, or a mixture thereof. Individual particles of the feed may be soft, hard, rigid, smooth, rough, or the like.

Figure 6:
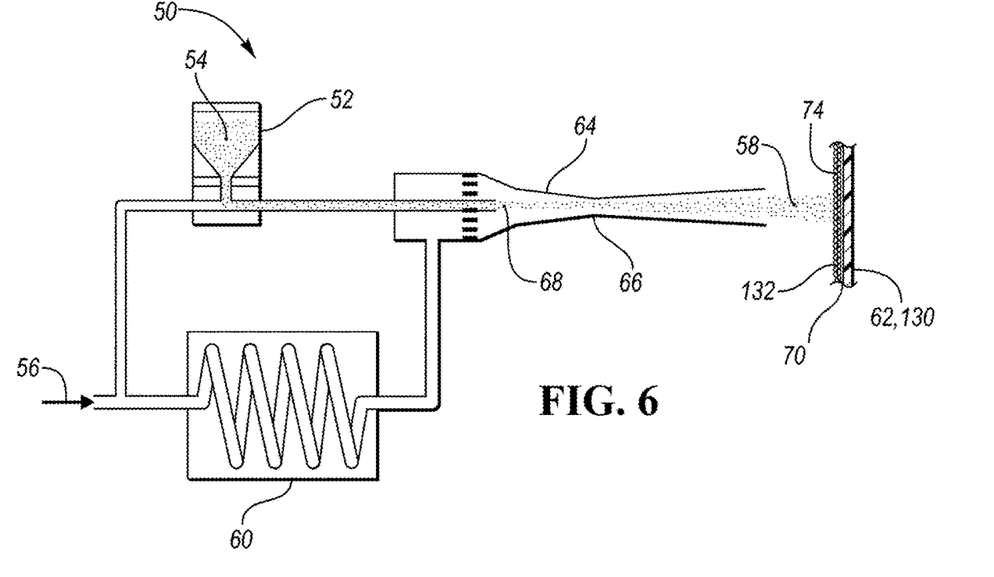
FIG. 6 shows a schematic view of an example cold spray system including an agglomerate-substrate interface produced in a cold spray system.
Figure 7A:
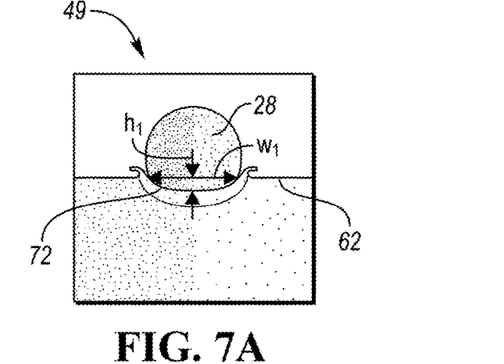
FIGS. 7A-7D depict changes in a particle-substrate interface upon impact of a solid particle with a surface of a substrate during a cold spray deposition process.
Figure 7B:
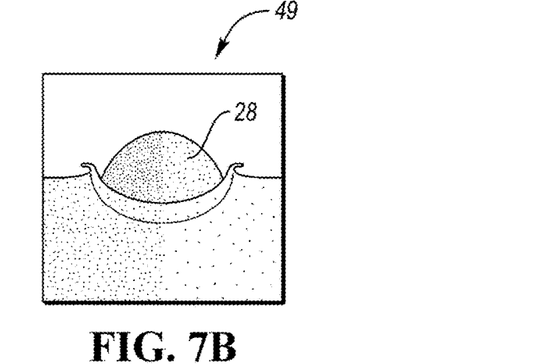
Figure 7C:
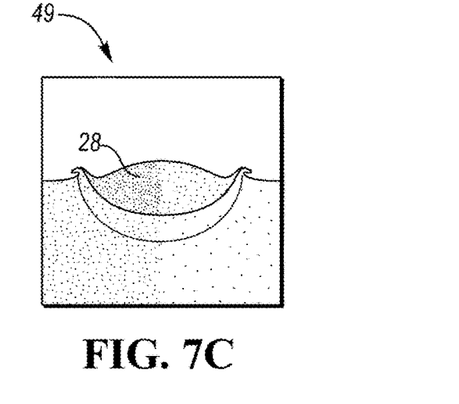
Figure 7D:
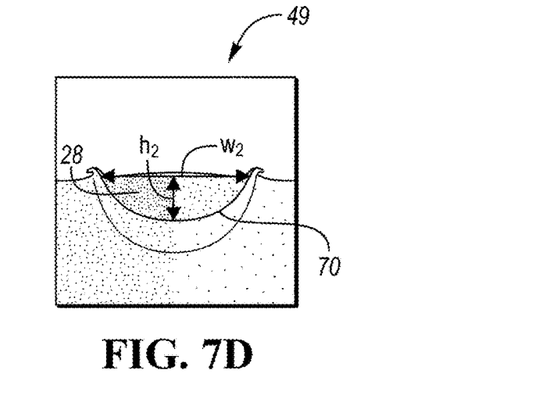

Example powder feed rate may be 1-10 pounds/hour. The system 50 further includes a gas inlet 56 for supplying gas capable of entraining the solid particles 58. The gas may be, for example, $N_2$, He, their mixture, or the like. A heater 60 is provided for heating the entraining gas to about 100-500° C. to increase ductility of the particles 58 to be deposited onto the substrate 62. The gas flow rate may be about 30-100 CFM. The powder feed 54 is inserted at high pressure and temperature at the entrance of the supersonic nozzle 64. The gas expands and accelerates through the nozzle 64 as its temperature decreases. Rapid changes take place at the nozzle throat 66, where gas supersonic velocity is reached. The velocity and temperature of the solid particles 58 approach gas values as heat transfer occurs.

The high pressure and temperature produced within the cold spray system 50 are capable of yielding supersonic gas velocities such as about 300-1500 m/s and high particle acceleration within the gas stream 68. The solid particles 58 are entrained within the gas stream 68 and directed towards the substrate 62, where they embed on impact and form a strong bond with the surface of the substrate 62. The kinetic energy of the particles 58, supplied by the expansion of the gas, is converted to plastic deformation energy during bonding. To achieve particle consolidation with the surface, a critical velocity must be reached before impact of the particles 58 with the substrate 62. The critical velocity differs depending on the feed type. Because the particles 58 remain in their solid state and undergo plastic deformation, their shape may become lenticular on impact, as is depicted in FIGS. 7A-7D.

FIGS. 7A-7D illustrate a sequence of changes at the particle-substrate interface 70 upon the solid particle's 58 impact with the surface of the substrate 62. As can be seen in the FIGS. 7A-7D, when the particle 58 encounters the substrate 62, the particle 58 flattens while a crater 72 forms in the substrate 62. The depth and width of the crater 72 increases with time such that $w_1 < w_2$ and $h_1 < h_2$. At the same time, the temperature at the impact zone rises, the rise being concentrated at the particle-surface interface 70. Yet, the discrete crystalline structure of the solid particle 58 is preserved upon impact. The resulting connection between the solid particles 58 and the substrate 62 produces a mechanical mixing at the particle-substrate interface 70 similar to explosive bonding.

Figure 8:
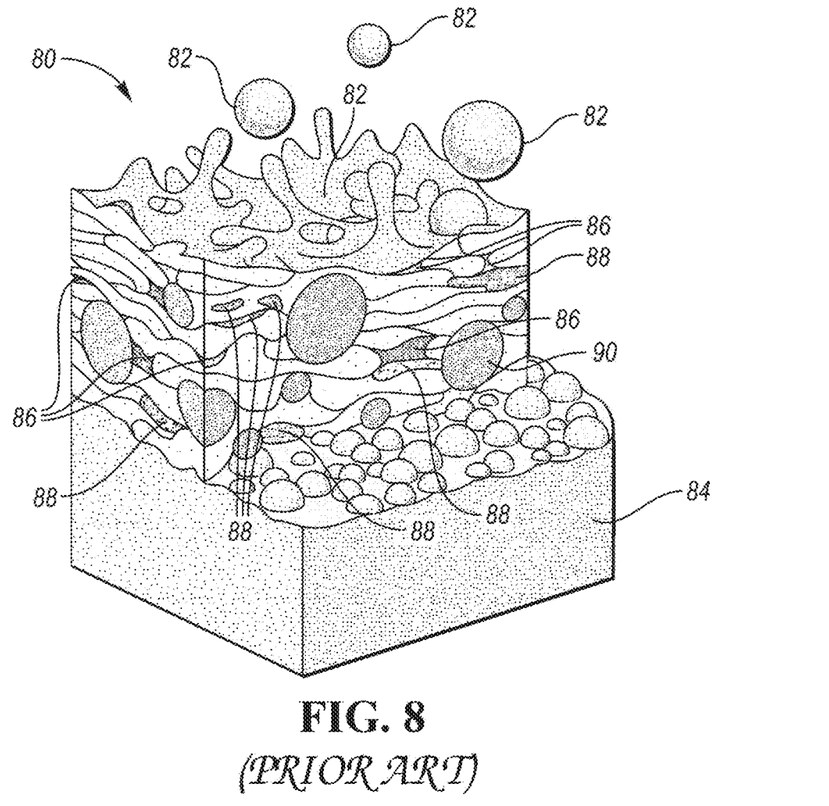
FIG. 8 depicts a perspective schematic view of a coating-substrate interface produced by a thermal spray deposition process.

In contrast to the cold spray deposited particles 58 depicted in FIGS. 7A-7D, a coating-substrate interface 80 of thermally sprayed molten particles 82 deposited on a substrate 84 is illustrated in FIG. 8. The resulting structure includes molten particles/material 82, voids 86, as well as oxide inclusions 88 and unmelted particles 90.

Advantageously, the mechanical mixing of cold spray deposition does not allow for presence of voids, typically associated with the coating-substrate interface 80 created by the thermal spray processes, at the particle-substrate interface 70. An example consolidated deposit of solid powder particles 58 forming the interconnects, described herein, as a void-free structure can be seen in FIG. 9. As can be further seen in FIG. 9, the thickness of the deposited particle layer, or the agglomerate 132, may be increased by supplying an additional amount of solid particles 58. In the formed agglomeration 132, the additional amount of particles 58 mechanically mix with the already deposited solid particles 58. No voids are created within the agglomerate 132. The particle-substrate interface 70 as well as the particle-particle interface 74 are free of voids and oxide inclusions.

Figure 9:
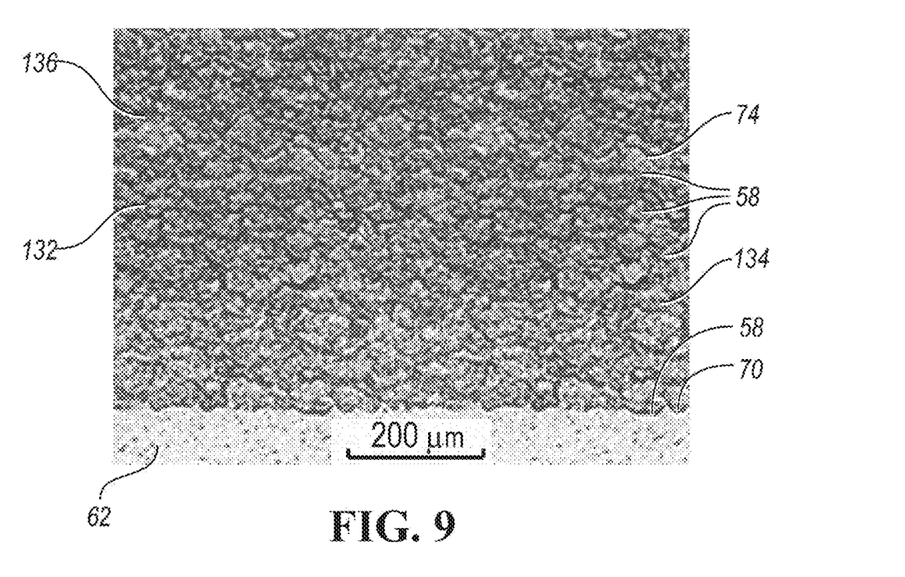
FIG. 9 depicts a schematic detailed view of the agglomerate-substrate interface forming interconnects depicted in FIGS. 2, 4C, and 5.

Since the interconnects 134, 234, 334 may be made from materials that are sensitive to the presence of oxygen and will readily oxidize at elevated temperatures, such as copper and aluminum, the thermal spray processes may produce interconnects of inferior quality. Yet, melting of the particles that occurs during most thermal spray processes, and which may result in oxidation of the coating and the substrate and thus lower performance of the module, is not present in the cold spray process. The agglomerate 132 and the particle-substrate interface 70, produced during the cold spray process, are thus free of oxide inclusions which could otherwise decrease the adhesive and cohesive strength of the coating 136 forming the interconnects 134, 234, 334. The interconnects 134, 234, 334 are thus deposited as a dense coating 136 with low oxide content of less than about 0.3 to 0.5%. The coating 136 is a non-porous or low-porous structure having porosity of less than about 0.5% to 2%. Yet, the coating 136 has physical characteristics such as strength comparable or surpassing those of some wrought materials. Exemplary adhesive strength of the particles 58 to one another and to the substrate 62 may be about 10 to 60 MPa or more, about 15 to 40 MPa or more, or about 15 to 25 MPa or more.

In one or more embodiments, a method for direct cold spray deposition of electrical interconnects 134 is disclosed. The method for producing interconnects 134, depicted in FIG. 2, includes providing a pouch cell 100 with tabs 116, 120. The tabs 116, 120 are perforated. The method contemplates perforating the tabs 116, 120 by one or more processes described above. The perforated tabs 116, 120 are then aligned with the bus bar 130. The alignment results in the majority of the surface area of the tabs 116, 120 being in direct contact with the surface area of the bus bar 130. The method further includes forming agglomerations 132 of solid metal particles within the perforations 126, as was described above. The solid particles are mechanically intermixed with the substrate, the bus bar 130, the agglomerations 132 being free of voids and/or oxide inclusions. The agglomerations 132 may form one or more layers of varying dimensions, shapes, locations, configurations, or a combination thereof. To prevent deposition of the agglomerations 132 elsewhere, a shield or a mask may be applied over the cell 200, the shield or mask preventing deposition of the sprayed material outside of the target areas. The agglomerations 132 forming the interconnects 134 may be cold spray deposited by the method described above.

The dimensions of the deposited material such as height, width, and thickness of the individual interconnects 134 may be varied according to the needs of a particular application. Likewise, at least some of the interconnects 134 may be made from a different material than the remaining interconnects 134. All of the interconnects 134 may be formed at the same time, or a first portion of interconnects 134 may be formed prior to cold spray deposition of a second portion of the interconnects 134. The cold-sprayed interconnects 134 may be planar, compact structures applied as a relatively flat coating 30 and thus may be more space-efficient than the welded or threaded stud interconnects.

In another embodiment, a method for forming interconnects 234, depicted in FIGS. 4A-4C, is disclosed. The method includes providing a plurality of cells 200 having castellated tabs 208, as was described above. The method further includes aligning the castellated tabs 208 with the bus bar 230. The alignment may be such that lower portions 242 of the tabs 208 overlap while the top portions 244 having prongs 238 interdigitate. Aligning may include placing the cells' top and/or side edge(s) flush with one another. The interdigitated prongs 238 may be aligned such that their sides are in contact with adjacent prongs 238. Alternatively, the method may include interdigitating the prongs 238 in such a way that the respective prongs 238 are not in contact with one another, and a gap 240 may form between adjacent prongs 238. The method further includes depositing solid metal particles forming agglomerations 232 over end portions/top portions 244 of the interdigitated prongs 238 and over a portion of the bus bar 230. The deposition may be also directed to and at least partially fill the one or more gaps 240. Additionally, an agglomeration 232 may cover one or more side edges of the prongs 238. The interconnects 234 may be formed as a single connected layer, such as an elongated stripe, or respective agglomerations 232 which are not in contact with each other. The method may include depositing the interconnects 234 as one or more layers having varying dimensions, location, orientation, shape, the like, or a combination thereof An agglomeration 232 forming the interconnects 234 may be deposited over the entire surface area of an interdigitated castellated tab 208 which is in contact with the bus bar 230. Alternatively, only a portion of the tabs 208 overlapping the bus bar 230 may be covered with the agglomerated material 232. The amount of agglomerated material 232 should be sufficient to ensure proper joining of the bus bar 230 with the tabs 208, preventing detachment, while providing good electrical connection. A mask may be utilized, as was described above.

A method of forming interconnects 334, depicted in FIG. 5, is further described herein. The method includes providing a plurality of cells 300 having tabs 308, which are characterized above. The method may include aligning the cells 300 and/or tabs 308 such as, for example, the top edges of the cells 300, the top and/or side edge(s) of the tabs 308, or a combination thereof, are flush with one another. The method includes placing a first cell 300' having a first tab 308' in contact with the bus bar 330 such that a top portion/end portion 346 of the tab 308' overlaps a bottom portion of the bus bar 330. An agglomeration 332 of solid metal particles is then deposited over the tab 308' and the bus bar 330. The method includes placing a second cell 300" having a second tab 308" over the first agglomeration 323' and the first tab 308' such that the second tab 308" is in contact with the bus bar 330. Specifically, the second tab 308" is in contact with the portion of the bus bar 330 which is located above the top edge of the first agglomeration 323'. A third cell 300'" having a third tab 308'" may be arranged in contact with the bus bar 330, the second agglomeration 323", and the second tab 308" in a similar fashion. Additional tabs 300 may be provided, application of each additional tab 308 being followed by deposition of an additional agglomeration 323. Layered or terraced interconnects 234 are thus created. As was described above, the tabs 308 may have a different width, height, and/or thickness, as long as the interconnects 334 form a terrace 342. The dimensions of the agglomerations 332 between respective tabs 308 may have the same or different dimensions, shape, location, orientation, the like, or a combination thereof.

The methods named above may include joining the same or different number of cells to each side of a bus bar. More than one methods described above may be used to form interconnects of a single battery pack.

While the dielectric material and/or the interconnects of the modules 100, 200, 300 may be formed by any type of cold spray deposition technique, a kinetic metallization process may provide a number of advantages. For example, the kinetic metallization process operates at sonic speeds and pressures of about 50 to 130 psig, which is lower than some other cold spray methods which require up to 700 psig. The lower pressure enables to perform the process while using smaller amount of gas such as up to $\frac{1}{10}$ of the gas needed in other types of cold spray methods.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A battery pack comprising:
   a bus bar;
   a pair of pouch cells, each having a tab extending therefrom and contacting the bus bar, the tabs being arranged adjacent to one another such that sides of the tabs are aligned, wherein the tabs are castellated, each tab having two or more prongs such that the castellated tabs interdigitate to contact the bus bar; and
   an agglomeration of solid metal particles mechanically bound via plastic deformation to each other, to at least some of the tabs, and to the bus bar, wherein the tabs are electrically connected to the bus bar, the solid metal particles are flattened and form craters in at least some of the tabs.

2. The battery pack of claim 1, wherein the prongs of a first castellated tab have different dimensions than the prongs of a second castellated tab.

3. The battery pack of claim 1, wherein the agglomeration of solid metal particles is free of voids, oxide inclusions, or both.

4. The battery pack of claim 1, wherein the agglomeration of solid metal particles covers at least a portion of each tab.

5. The battery pack of claim 1, wherein the agglomeration of solid metal particles covers an entire surface of each prong.

6. The battery pack of claim 1, wherein each tab extends from the pouch cell to a different height as compared with the other tab such that the aligned tabs form a terrace.

7. The battery pack of claim 6, wherein a height of the first tab is at least 50% smaller than a height of a second tab.

8. The battery pack of claim 6, further comprising a plurality of agglomerations of mechanically bound solid metal particles layered over an end of each of the tabs and a portion of the bus bar to electrically connect the tabs to the bus bar.

9. The battery pack of claim 1, wherein the plurality of pouch cells includes at least three cells.

10. The battery pack of claim 1, wherein the tabs have a different chemical composition.

11. The battery pack of claim 1, wherein at least some of the tabs have a width smaller than a width of the bus bar.

12. The battery pack of claim 1, wherein each particle in the agglomeration of solid metal particles has a discrete crystalline structure.

13. The battery pack of claim 1, wherein the tabs include at least one perforation each.

14. The battery pack of claim 1, wherein each tab includes at least one row of perforations.

15. The battery pack of claim 12, wherein the perforations are circular.

16. The battery pack of claim 12, wherein the perforations within at least one of the tabs have different dimensions.

17. The battery pack of claim 12, wherein the perforations are arranged in a regular pattern.

* * * * *